Feb. 22, 1927.                  L. DIAMOND                    1,618,642
                      COMBINATION BED AND CHIFFOROBE
                     Filed Aug. 21, 1926      2 Sheets-Sheet 1
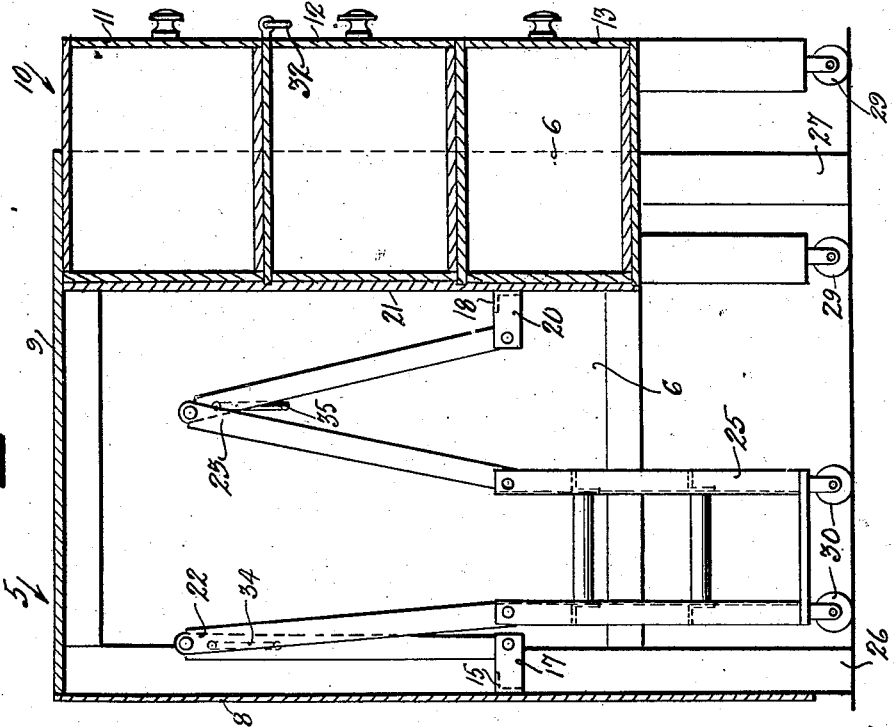
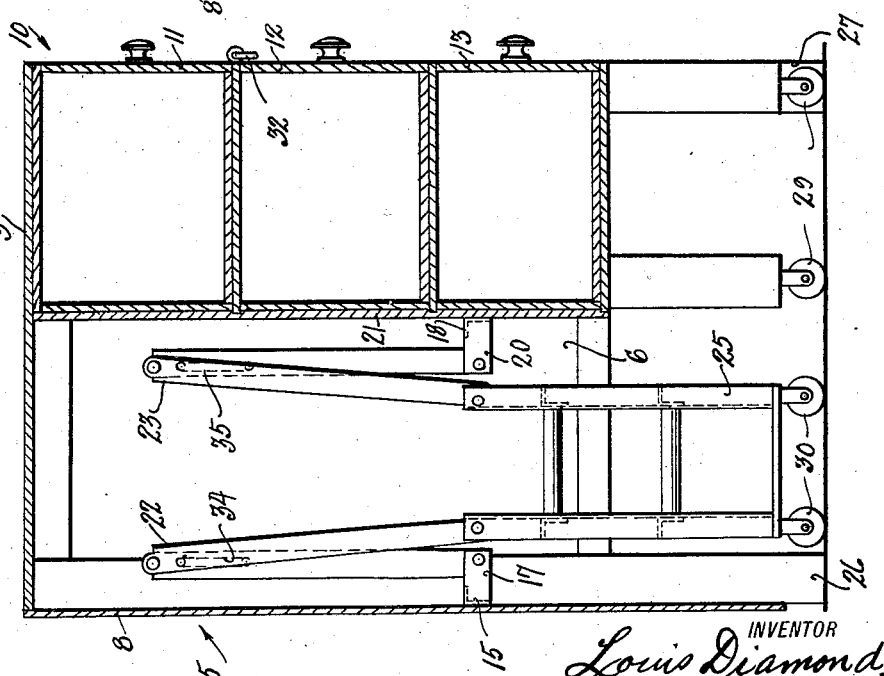
INVENTOR
Louis Diamond
BY
ATTORNEY Feb. 22, 1927. 1,618,642
L. DIAMOND
COMBINATION BED AND CHIFFOROBE
Filed Aug. 21, 1926 2 Sheets-Sheet 2
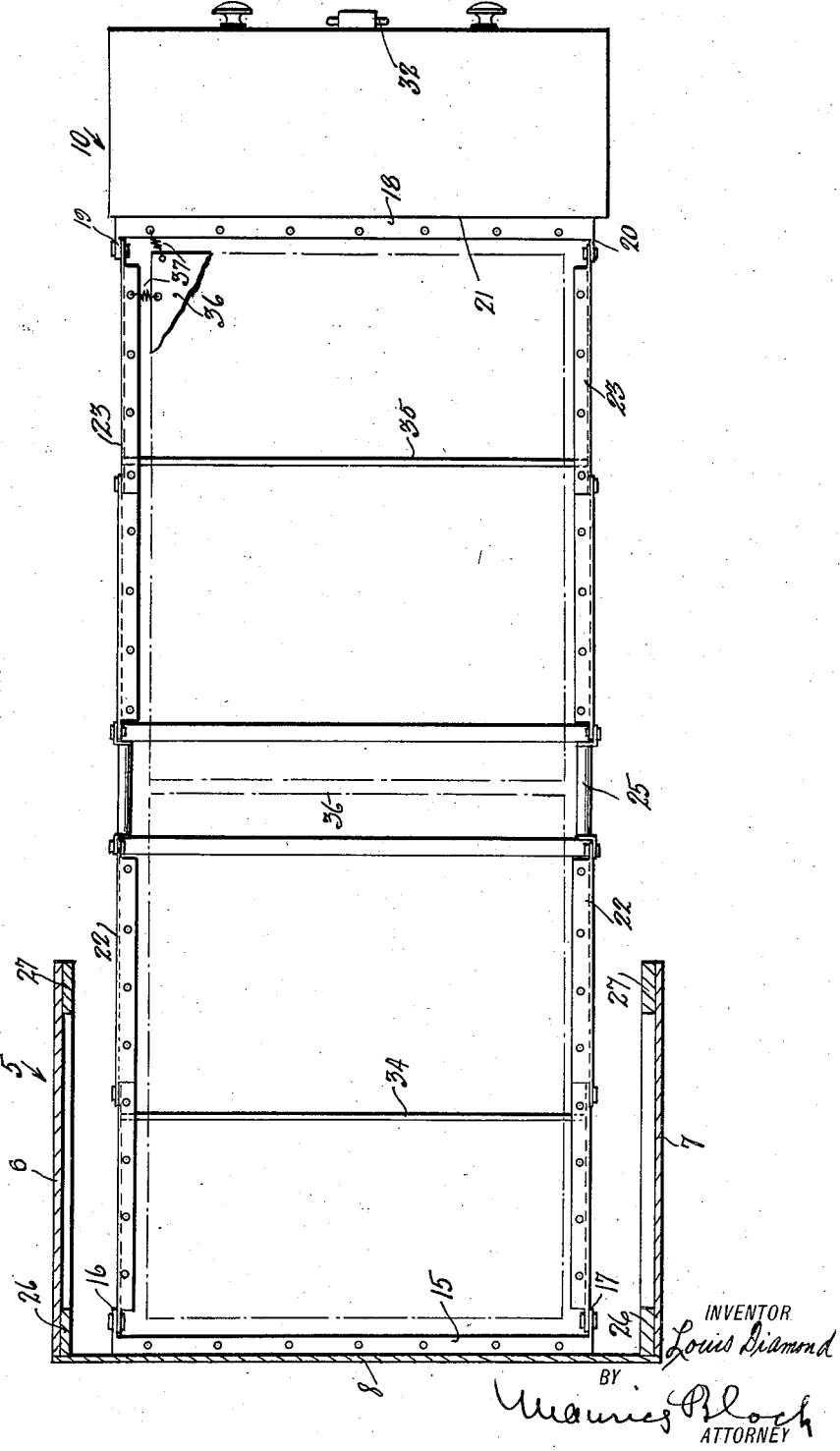
INVENTOR
Louis Diamond
BY
Maurice Bloch
ATTORNEY Patented Feb. 22, 1927.

1,618,642

UNITED STATES PATENT OFFICE.

LOUIS DIAMOND, OF NEW YORK, N. Y.

COMBINATION BED AND CHIFFOROBE.

Application filed August 21, 1926. Serial No. 130,588.

This invention relates to combined foldable bedsteads and wardrobes, such as chiffoniers, chifforobes and the like.

The main object of the invention is to provide a piece of furniture of this character adapted to be folded by day and used as a wardrobe and to be extended by night to be used as a bed, in apartments where the space is limited.

Other objects and novel features of construction will become more apparent as the specification proceeds.

In the drawings forming a part of this specification,

Figure 1 is a side view partly in section of my improved and combined bed and wardrobe, with the bed portion in folded position.

Figure 2 is a similar view to Figure 1, with the bed portion partly extended, and Figure 3 is a top plan view partly in section, showing the bed fully extended.

Referring now to the drawings in detail in which like numerals refer to the same parts throughout the several views, 5 indicates a housing, comprising side walls 6 and 7, a rear wall 8 and a top 9. When the bed is in folded position as illustrated in Fig. 1, the housing 5 encloses on the sides, rear and top thereof a wardrobe 10 having a chest of drawers 11, 12 and 13 slidably mounted therein. It may here be stated that instead of a chest of drawers, a container or wardrobe of any description may be substituted therefor.

To the rear wall 8 of the housing 5 there is suitably fastened an angle iron 15 provided with ears or extensions 16 and 17. A similar angle iron 18 provided with ears 19 and 20 is secured to the rear wall 21 of the wardrobe 10 at substantially the same height from the floor as the angle iron 15. To each of the ears of these angle irons 15 and 18 there are pivotally secured two part foldable sections 22 and 23 respectively. The foldable sections 22 and 23 are pivotally secured to a truck or frame work 25 intermediate the walls 8 and 2.

The housing 5 rests upon legs 26 and 27 at the rear and front thereof, while the wardrobe 10 and the truck 25 are adapted to ride on casters 29 and 30 when the bed is being extended.

In order to extend the bed, a handle 32 fixed to the wardrobe 10, is pulled forwardly, causing the said wardrobe to ride out of the housing 8 and thus extend the folded section 23 which will in turn when fully extended, draw upon the truck 25 connected to the folded section 22 and cause same to be extended.

The foldable sections 22 and 23 are provided with spreader bars 34 and 35 to maintain same in proper lateral position as well as to strengthen the entire structure. Canvas sheets or bed springs 36 may be attached to the bed frame by means of coiled springs 37.

It will be seen by referring to Figs. 1 and 2 of the drawings that ample room is provided for the bedding between the foldable sections 22 and 23, and the sides of the truck 25.

From the foregoing it will be seen that I have provided a combined and extensible bed and wardrobe, easy to manipulate, inexpensive in construction, and yet substantially built.

Having described my invention, what I claim as new is:

1. A combined bed and wardrobe, comprising a casing, a wardrobe within the casing adapted to be withdrawn therefrom, a truck intermediate the rear walls of the casing and wardrobe, foldable connecting means intermediate the rear end of the truck and said rear walls and foldable connecting means intermediate the front end of the truck and the wardrobe.

2. A combined bed and wardrobe, comprising a casing, a wardrobe adapted to slide in and out of said casing, a slidable truck intermediate said casing and wardrobe, a cross bar on each of the rear walls of the casing and wardrobe, foldable sections pivotally secured to the truck and the bar on the wardrobe, and like foldable sections similarly secured to the truck and the bar on the rear wall of the casing.

3. A combined bed and wardrobe, comprising a casing, a wardrobe adapted to slide in and out of said casing, a slidable truck intermediate said casing and wardrobe, a cross bar on each of the rear walls of the casing and wardrobe, a foldable section intermediate the truck and wardrobe pivotally secured to the truck and the bar on the wardrobe, a foldable section intermediate the truck and casing pivotally secured to the truck and the cross-bar on the casing, a bed spring resiliently secured to the foldable sections intermediate the wardrobe and truck, and a like spring similarly secured to the foldable sections intermediate the truck and casing.

4. A combined bed and wardrobe, comprising a housing, a wardrobe adapted to slide in and out at the front of the housing, a slidable truck intermediate the rear wall of the housing and the rear wall of the wardrobe, foldable sections connecting the truck and the wardrobe and adapted to be unfolded when the wardrobe is slid out of the casing, and like foldable sections connecting the truck to the casing adapted to be unfolded when the wardrobe is slid out to its full extent.

In testimony whereof I hereunto affix my signature.

LOUIS DIAMOND.